Aug. 14, 1928.

F. G. SLAGEL 1,680,697

HOLLOW BODY

Filed July 5, 1927

Inventor
Franklin G. Slagel
By Pope & Powers
Attorneys

Patented Aug. 14, 1928.

1,680,697

UNITED STATES PATENT OFFICE.

FRANKLIN G. SLAGEL, OF BUFFALO, NEW YORK, ASSIGNOR TO FEDDERS MANUFACTURING COMPANY, INC., OF BUFFALO, NEW YORK, A CORPORATION OF NEW YORK.

HOLLOW BODY.

Application filed July 5, 1927. Serial No. 203,304.

This invention relates to a hollow sheet metal body which is more particularly adapted to be employed as a float in connection with a float controlled valve mechanism, but the same may also be used for other purposes.

It is the object of this invention to provide a hollow body which is strong and durable and not liable to collapse, and which can be manufactured easily and at low cost.

Figure 1:
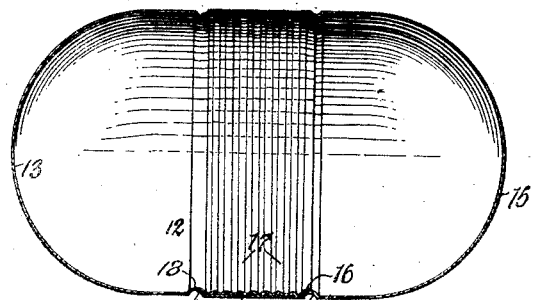
Figure 2:
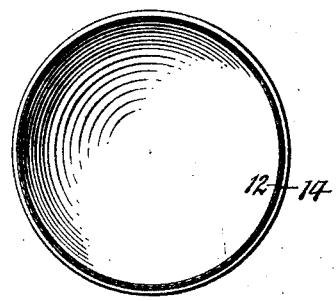
Figure 3:
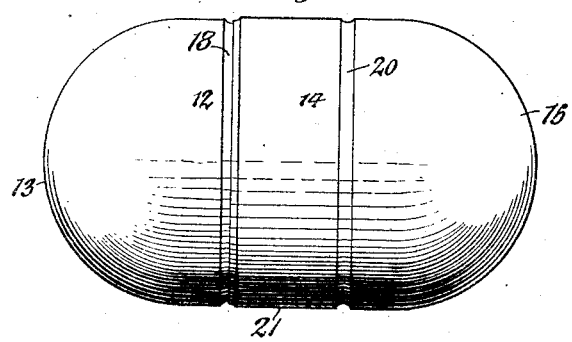
Figure 4:
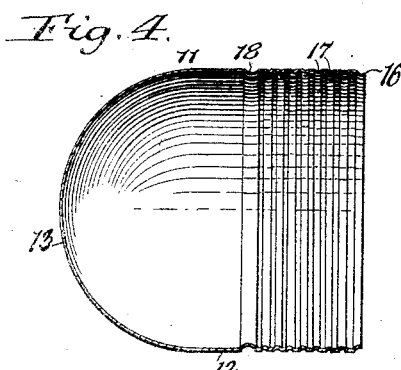
Figure 5:
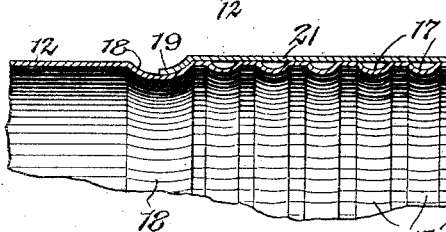
Figure 6:
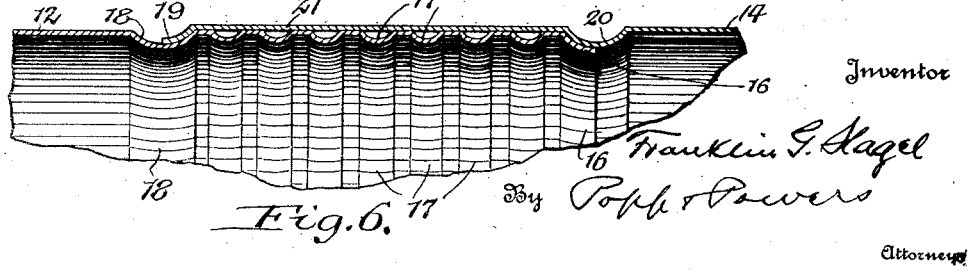

In the accompanying drawings:

Figure 1 is a longitudinal section of a hollow sheet metal body embodying my improvements. Figure 2 is a cross section taken on line 2—2, in Fig. 1. Figure 3 is a side elevation of the completed hollow body. Figures 4 and 5 are longitudinal sectional views of the two sections or parts of the improved hollow body showing the condition of the same before the same are united. Figure 6 is a fragmentary longitudinal section, on an enlarged scale, of the joint between the two sections of the hollow body.

Similar characters of reference indicate like parts in the several figures of the drawings:—

This hollow elongated body consists of outer and inner sections 10, 11, each of which is constructed of a single piece of sheet metal so as to be of substantially cup-shape form. The inner section 11 has a cylindrical wall 12 which is closed at its outer end by an outwardly bulging head 13 and the outer section 10 has a cylindrical wall 14 which is closed at its outer end by an outwardly bulging head 15. The inner wall is of slightly smaller diameter than the outer wall and the inner wall telescopes into the outer wall with a comparatively close fit. The inner wall is provided at its inner end with a partial inwardly projecting stop bead or corrugation 16 extending circumferentially around this wall, also with a plurality of complete stiffening beads or corrugations 17 extending circumferentially around this wall and arranged at different distances from the inner end of this wall, and also with a complete sealing bead 18 adjacent to the outermost stiffening bead 17. The partial bead 16 is preferably quarter round in cross section and the complete beads 17 and 18 are preferably half round in cross section. The stop and sealing beads 16 and 18 are curved on a comparatively long radius while the stiffening beads 17 are curved on a comparatively short radius so that the stop and sealing beads are deeper than the stiffening beads.

The wall of the outer section is provided with a partial sealing bead 19 which projects inwardly and extends circumferentially around the same and interlocks with the outer sealing bead 18 of the inner section and it is also provided at a distance from its inner edge with a complete stop bead 20 extending circumferentially around this wall and interlocking with the partial stop bead 16 of the inner wall, and between its sealing and stop beads 19 and 20 the wall of the outer section is provided with a straight unbeaded or uncorrugated section 21 which extends over the shallow stiffening beads of the wall of the inner section. The joint between the inner and outer sections is hermetically sealed so as to render the same water and air tight by applying solder to the cooperating outer sealing bead 18 of the inner wall and the inner sealing bead 19 of the outer wall and sweating these two beads together so that the same are practically integral.

In the manufacture of this hollow body the inner section is made complete as shown in Fig. 4, but the outer section is made incomplete by omitting its partial sealing bead 19, as shown in Fig. 5. After the sections have been thus made separately the wall of the outer section is slipped over the wall of the inner section until the stop bead 20 of the outer section engages the partial stop bead 16 of the inner section, at which time the free edge of the outer section overhangs the sealing bead 18 of the inner wall. The inner end of the outer wall is now bent inwardly to form the sealing bead 19 which interlocks with the sealing bead 18 of the inner wall. Thereafter the beads 18 and 19 are united by solder and sweating to hermetically seal the sections of the hollow body and complete the work.

By means of the stop beads the two sections can be readily assembled so that they occupy the proper relative position, the plurality of small beads on the inner wall strengthen the float so that the same is not liable to be crushed, the nonbeaded part of the outer section forms a smooth exterior for the float which permits of readily cleaning the same, and the interlocking sealing beads securely unite the sections and permit of conveniently sealing the joint between the sections.

I claim as my invention:

1. A hollow elongated body comprising two cup-shaped sections of sheet metal each of which has a cylindrical side wall, the walls of the two sections telescoping one within the other, the inner wall having a partial stop bead extending circumferentially around this wall at the inner end of the same and a plurality of complete beads extending circumferentially around this wall at different distances from the end thereof, and the outer wall having an inwardly projecting circumferential stop bead engaging with the partial bead of the inner wall and a blank part extending over other beads of the inner wall.

2. A hollow elongated body comprising two cup-shaped sections of sheet metal each of which has a cylindrical side wall, the walls of the two sections telescoping one within the other, the wall of the inner section having a partial stop bead extending circumferentially around this wall at the inner end thereof, a complete sealing bead extending circumferentially around this wall at a distance from the partial stop bead and a plurality of strengthening beads between said stop bead and said sealing bead, and the wall of the outer section having a complete stop bead engaging with the partial stop bead of the inner wall, a partial sealing bead engaging with the complete sealing bead of the inner wall, and a blank part extending over the strengthening beads of the inner wall.

In testimony whereof I affix my signature.

FRANKLIN G. SLAGEL.